Feb. 27, 1945. T. ULRICH 2,370,211
VEHICLE STRUCTURE, ESPECIALLY TONNEAU BOTTOM STRUCTURE
Filed Aug. 2, 1940 4 Sheets-Sheet 1
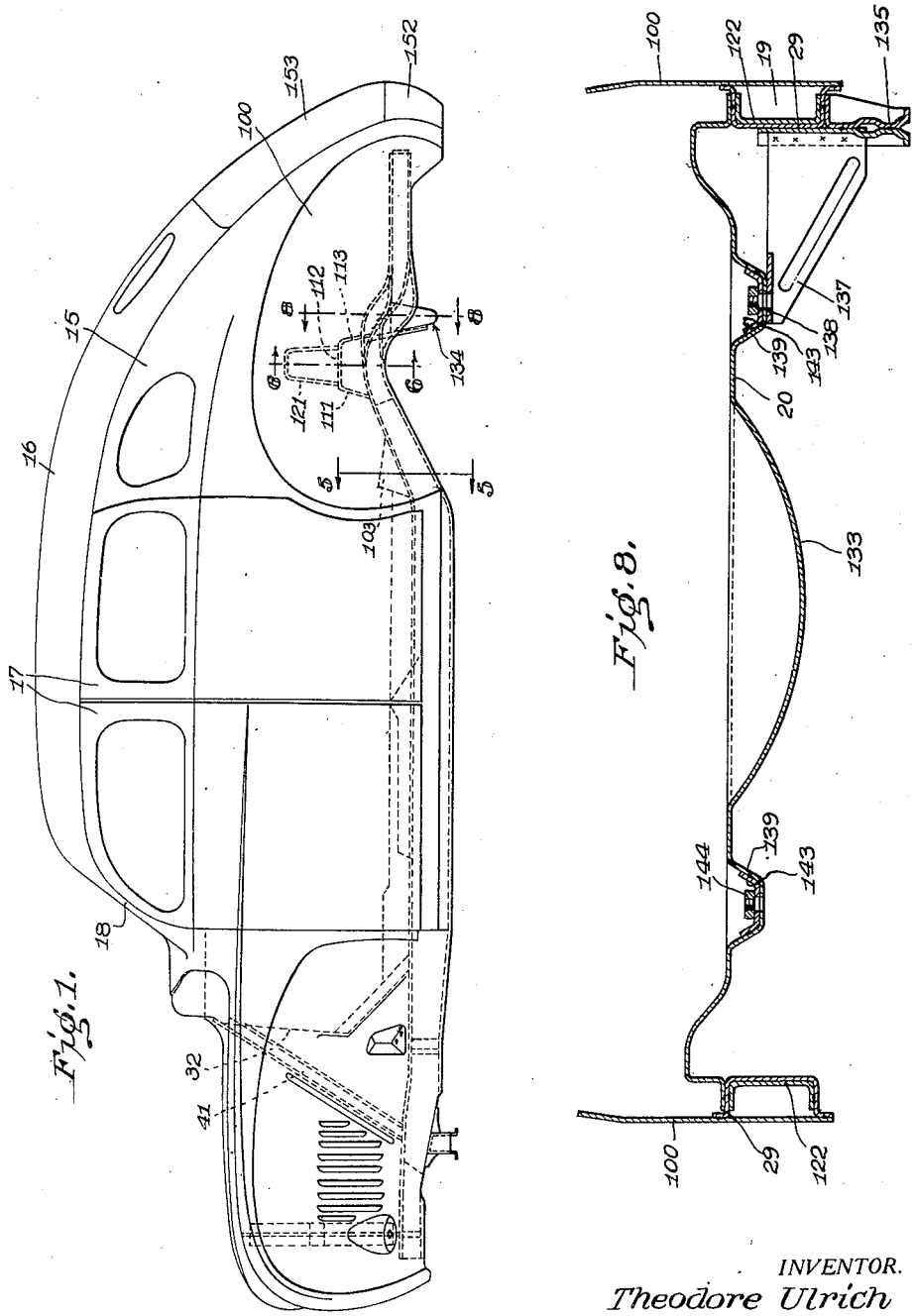
INVENTOR.
Theodore Ulrich
BY John P. Tarbox
ATTORNEY.

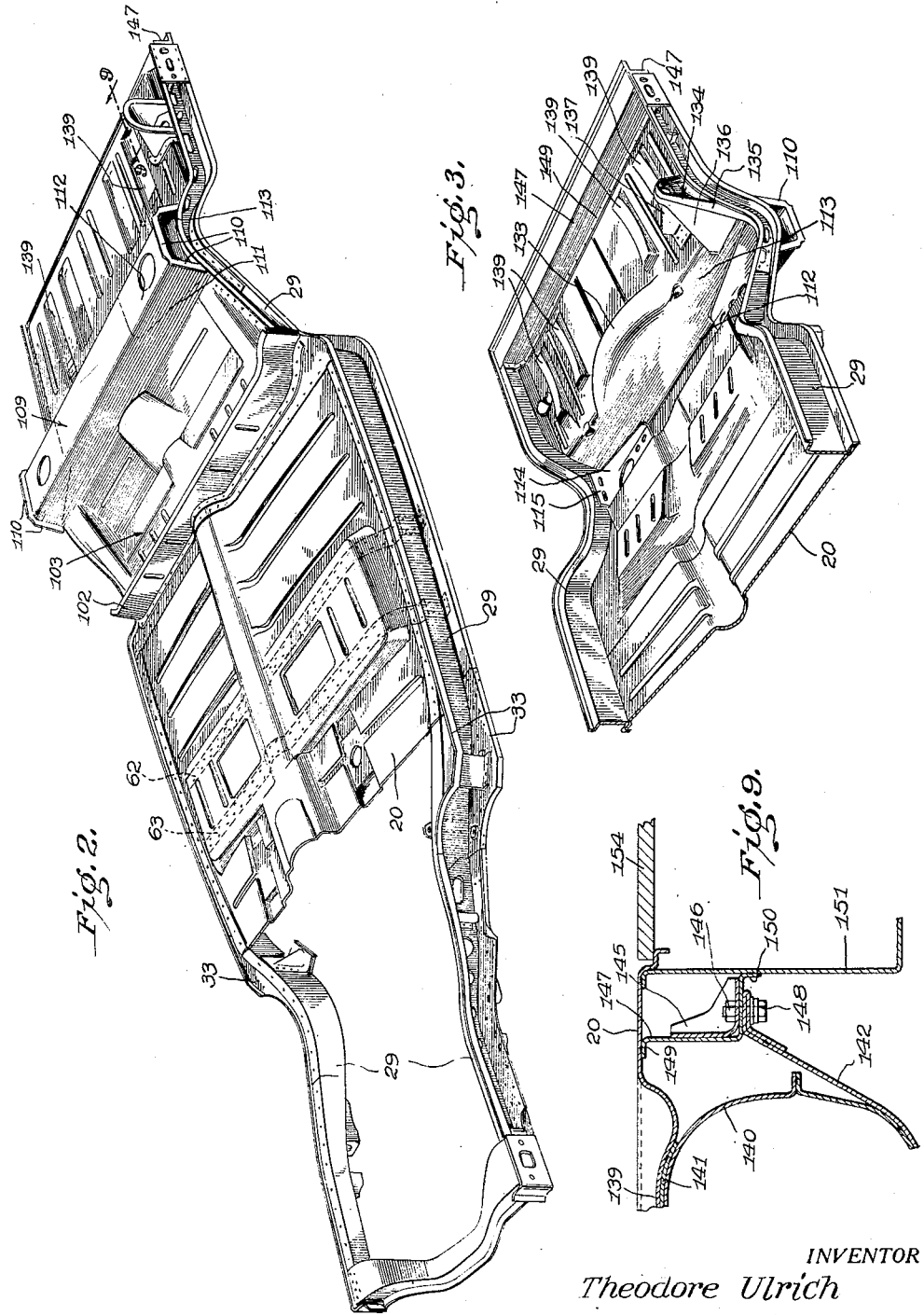

Feb. 27, 1945.  T. ULRICH  2,370,211
VEHICLE STRUCTURE, ESPECIALLY TONNEAU BOTTOM STRUCTURE
Filed Aug. 2, 1940  4 Sheets-Sheet 3

INVENTOR
Theodore Ulrich
BY John P. Tarb
ATTORNEY

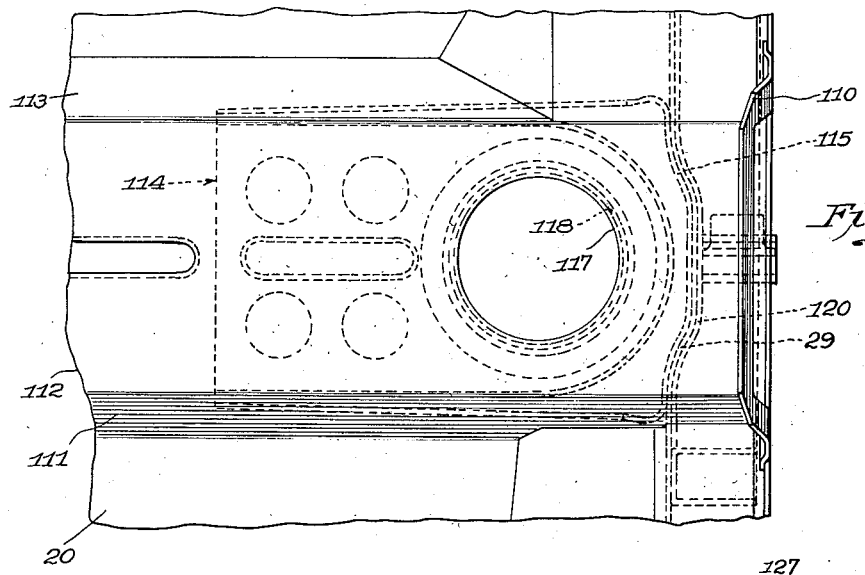

Patented Feb. 27, 1945

2,370,211

UNITED STATES PATENT OFFICE 2,370,211

VEHICLE STRUCTURE, ESPECIALLY TONNEAU BOTTOM STRUCTURE

Theodore Ulrich, Detroit, Mich., assignor to Edward G. Budd Manufacturing Company, Philadelphia, Pa., a corporation of Pennsylvania Application August 2, 1940, Serial No. 349,922

20 Claims. (Cl. 296—28)

The invention relates to a vehicle structure and more particularly to a structure of an automobile body in the bottom region of the tonneau. The invention has, moreover, outstandingly to do with the so-called self-sustaining body type, that is the type which, or at least the bottom structure of which, performs at the same time the functions of the chassis.

The invention is chiefly designed for, though not necessarily restricted to, the type of body, the construction of the front end section of which is disclosed in the simultaneously filed application, Serial No. 349,704, "Vehicle structure, especially front end structure," of applicant and of Deisley and Lindsay and in the applications referred to in said simultaneous application.

It is among the objects of the invention to reinforce the body structure especially in the tonneau region without materially increasing the weight of the body and the production costs.

Further objects of the invention have to do with provisions for the reception and the support of wheel suspension means and a fuel tank.

These and other objects of the invention are achieved by using certain parts of the structure which are primarily designed for other purposes, simultaneously as strong transverse or diagonal bracing members between side sills, floor panel and side walls.

One of such features of the invention consists in using a transverse floor panel offset as support for a seat cushion as well as for a transverse brace between the vertical side wall portions of the body.

Another such feature of the invention consists in providing a housing which is adapted to receive and support an airplane- or strut-type shock absorber as well as to act as a diagonal brace between the floor panel or a transverse reinforcement thereof and an adjoining side wall portion.

A still further feature of the invention consists in the provision of projections formed as one piece with the floor panel and shaped so as to present a bed for a fuel tank and at the same time reinforcements for the floor panel itself.

Further objects, advantages and features of the invention will become apparent from the following description of some embodiments of the invention when read in connection with the attached drawings.

In the drawings:

Figure 1 is a diagrammatic side elevation of a body according to one embodiment of the invention.

Figure 2 is a perspective view of the body underframe structure, the side panels entering into the structure and adjoining structural parts at the front end being omitted.

Figure 3 is a perspective view of the underside of the rear end of the underframe shown in Figure 2.

Figure 6 is a fragmentary section along lines 6—6 of Figures 1 and 4.

Figure 7 is a plan view of the underframe structure shown in the region of the sectional view of Figure 6.

Figure 8 is a fragmentary transverse section along line 8—8 of Figure 1.

Figure 9 is a fragmentary section through a rear end portion of the floor panel taken substantially along line 9—9 in Figure 2 and through a fuel tank secured to the underframe.

Figure 10 is a fragmentary perspective view of a modified form of one feature of the invention, this view being taken in the region of line 6—6 of Figure 1.

Figure 4:
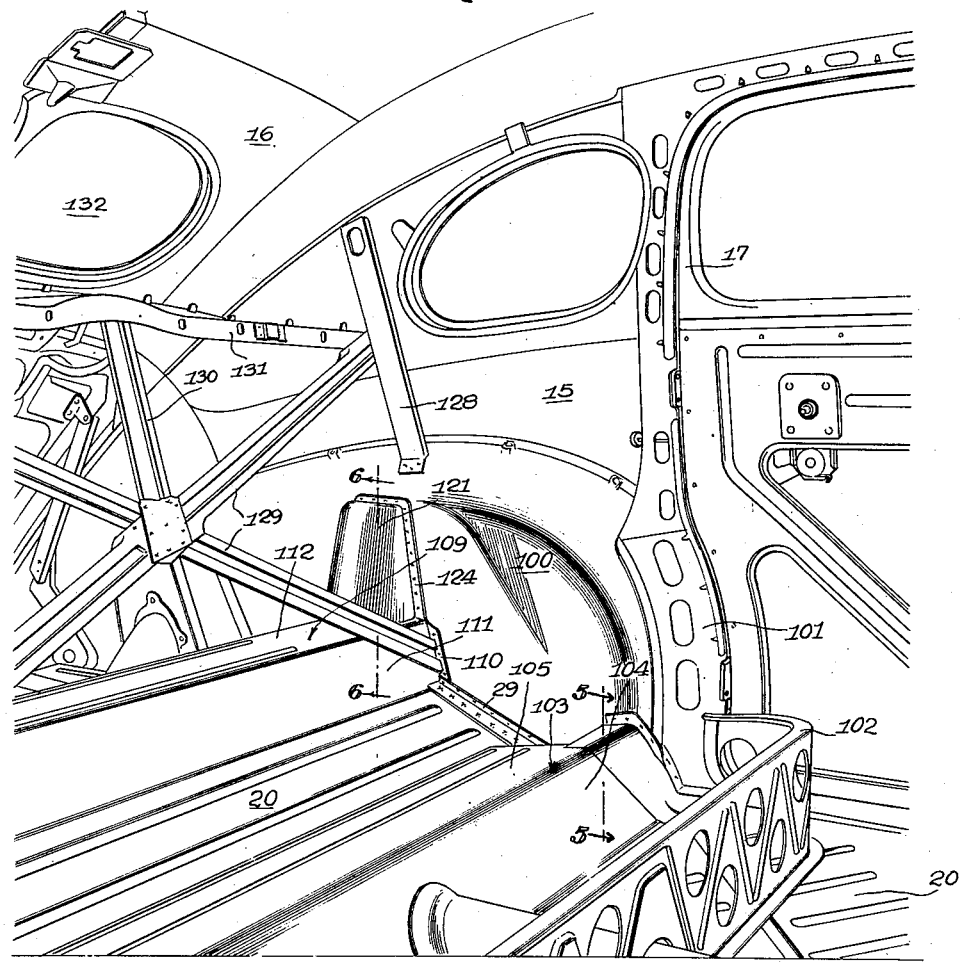
Figure 4 is a fragmentary perspective inside view of the tonneau section of the body shown in Figure 1.
Figure 5:
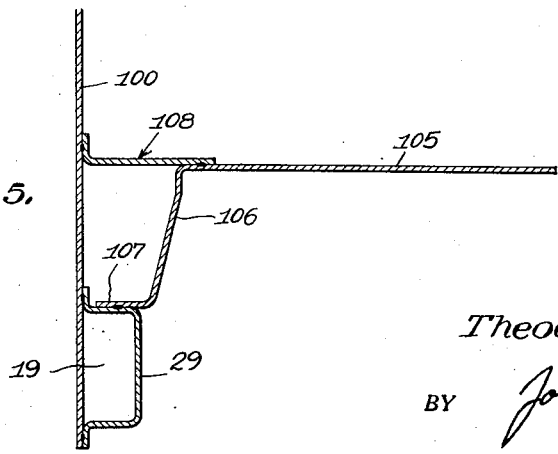
Figure 5 is a fragmentary transverse section along lines 5—5 of Figures 1 and 4.

The body comprises as main elements: side walls 15, a roof 16, side doors 17, a front wall 18, side sill structures 19 and a floor panel structure 20. The reinforcement of the front end by means of the shroud pan 32, the inclined members 41, and transverse members 62 and 63, as well as the formation of the main side sill members 29, the adjoining threshold portions, the sill extensions 33 and the remainder of the front end members are shown and described at length in the simultaneously filed application referred to hereinbefore and in the division thereof, Serial No. 430,060, "Vehicle body underframe or chassis," of Ulrich and Lindsay, filed February 9, 1942.

The side sill members 29 are extended to the rear end of the body and have in the tonneau section the open sides closed by the rear wheel housing panels 100, each of which is preferably formed as a one-piece stamping with the adjoining portion of the side panel 15. At the forward end of the wheel housing is arranged the usual rear door posts 101. Between the posts 101 on both sides of the body is inserted a heel board 102 which serves to support the front edge of the rear seat cushion (not shown). This heel board member 102 has its rearwardly extending ends rigidly fastened to said posts and its lower margin rigidly connected to the main body of the floor panel 20.

In the rear of and spaced from said heel board 102, the floor panel is provided with an offset 103, this offset having an upwardly and rearwardly inclined front wall 104, a rearwardly adjoining slightly downwardly inclined wall 105 and side walls 106 which latter merge into marginal portions 107 of the main body of the floor panel 20.

The wall 105 of the offset serves as a support for the rear portion of the rear seat cushion and simultaneously as a transverse reinforcement for the floor panel itself. The marginal portions 107 of the floor panel rest upon and are fastened to the upper wall of the sill members 29 in the same manner as the floor panel margins are fastened to such sill members in front and in rear of the offset 103. A bridging member 108 is fastened to each end of the offset 103 and has its arms overlapping and fastened to the offset portions 104 and 105, and its marginal flange fastened to the wheel housing 100 and the door posts 101 respectively. By means of these bridging members 108, the offset 103 forms an uninterrupted transverse brace between the lower portions of the wheel housings 100 and the lower portions of the rear door posts 101. The space formed between the wall 104, the heel board 102 and the main body of the floor panel 20 proper, may serve as a storage compartment.

Rearwardly spaced from the offset 103, there is provided a second offset 109 in the floor panel which extends all the way across the panel and has its ends fastened to the wheel housing walls 100 by means of flanges 110. This offset 109 comprises a front wall 111, a top wall 112 and a rear wall 113. Nested into each end of this channel-shaped offset 109 is a reinforcement 114 which is likewise channel-shaped in longitudinal vertical section and of angle form in a transverse section as shown in Figure 6. The bottom and side walls of this channel member 114 fit against and are fastened such as by welding to the top and side walls 112, 111, 113 of the offset 109 and the downwardly extending arm 115 of this member overlaps and is fastened to the inner wall of the sill member 29.

The wall 112 and the upper wall of the member 114 are provided with registering openings which serve for the passage of an airplane-type shock absorber 116. Flanges 117, 118 around these openings serve as reinforcements and the flanges 118 serve besides for the proper location of the upper ends of coil springs 119, the lower ends of which rest against a wheel supporting member such as an axle (not shown). Each member 114 with its arm 115 ties the upper spring support right into the adjoining portion of the sill member 29 which in this region is additionally reinforced by a channel-shaped member 120.

Above each opening in the top wall 112 of the offset 109 is fastened a housing 121 which is about half-circular in horizontal section and the diameter of which gradually decreases from its lower end upwardly. The upper end of the housing 121 is closed by a wall 122 and the free edges of the housing are provided with flanges 123 and 124 by which it is fastened such as by welding to the top wall 112 and to an offset portion 125 of the wheel housing 100. This offset 125 does not only reinforce the wheel housing but allows also the use of a comparatively shallow housing 121 and brings the wheel housing wall near to the supporting point for the upper end of the shock absorber 116. Furthermore, the offset may be of such extent as to facilitate the insertion or removal of the wheel (not shown). The upper wall of the housing 121 is reinforced by an inner plate or stamping 126. This member 126 and the end wall 122 are provided with registering openings through which the end of the shock absorber 116 extends and on both sides of which conventional resilient fastening means 127 for the shock absorber are located.

As visible from Figure 7, the inner wall of each sill member 29, the arm 115 of the reinforcing member 114 and the sill reinforcement 120 are outwardly offset in the region of the spring 119, thereby allowing to place the spring 119 farther away from the center line of the vehicle with the consequential improvement in transverse stability. The reduction of the cross-sectional area of the sill 19 is compensated by the reinforcement due to the members 114/115, 120 and 121.

The housing 121 acts as a very strong reinforcement of the wheel housing and as a kind of diagonal brace between the upper part of the wheel housing and the adjoining portions of the transverse sill formed by the offset 109. This reinforcement is the more important as it is located in the region of the vertical reinforcements 128 of the body side walls and the transverse reinforcements 129, 130, 131, which are arranged in back of the rear seat back cushion (not shown). The members 129 have their lower ends fastened to the front wall 111 of the offset 109 and the other ends to the vertical reinforcements 128 whereas the member 131 is fastened to the same members 128, to the central vertical brace 130 and to the outer body paneling 15 and 16 below the rear view opening 132. The offset 109, the housings 121 and the members 128 to 131 form together in effect a very strong transverse bulkhead between the bottom, the side wall and the roof or rear wall structure of the body.

Immediately in rear of the offset 109, the floor panel 20 is provided with a downwardly extending well 133 for the reception of a spare tire. A bracket 134 consisting of the members 135, 136, and 137 is fastened to one of the side sill members 29 in about the same longitudinal region as this well 133. These members, which are reinforced by flanges and offsets, overlap and are welded to each other and certain portions of them overlap and are welded or riveted to the sill member 29, the latter being also in this region reinforced by the before-mentioned member 120. This member 120 extends as a matter of fact to the rear end of the side sill member so as to serve at the same time as a proper foundation for the attachment of the rear bumper and so as to reinforce the rear end of the body which extends freely beyond the rear wheel suspension and as to support the luggage. The member 137 is substantially angle-shaped in horizontal section, the one arm resting against the inner wall of the sill member 29 and against the member 135, whereas the other arm is fastened by a tongue 138 to an offset 139 of the floor panel. The member 136 overlaps and is fastened to the rear wall 113 of the offset 109. The lower end of the bracket 134 serves for the attachment of a stabilizing rod, the other end of which is attached at the opposite side of the vehicle to the rear axle. This rod and its attachment are not shown because they are well-known in the art. It will have become apparent that the bracket 134, which in a coil spring suspension arrangement has to take up all the side thrusts between the body and the rear wheels, is strongly tied into the adjoining body structure and especially into the transverse member 108 in such a manner that the stresses are distributed over a comparatively wide area of the self-sustaining body construction and stress concentrations are avoided.

Two or more elongated offsets 139 are arranged in transversely spaced relation in the rear of the well 133. The underside of these offsets 139 is convex so as to make them conform to a fuel tank 140. A somewhat resilient lining 141 is inserted between those offsets or projections 139 and the fuel tank 140 which latter is held against the lining by straps 142. The forward ends of these straps are fastened to reinforcements 143 provided with nuts 144 by means of screw bolts (not shown). The rear ends of the straps 142 are fastened in a similar manner to brackets 145 and nuts 146 arranged and fastened in a transverse rail 147 by bolts 148. The straps do not require any means for the adjustment of their length. The length of the straps between the holes for the fastening bolts is intentionally made slightly shorter than it would appear to be required on account of the distance between the fastening points on the body structure and of the form of the tank. This slight under-measure and variations in the dimensions of any of the members entering into this strapping arrangement are compensated by the resiliency of the offsets 139 and the adjoining main portion of the floor panel 20. This fastening of the fuel tank is deemed to be exceptionally inexpensive and simple.

The transverse member 147 is angle-shaped in cross-section and fastened by a flange 149 to the underside of the floor panel 20 and by a flange 150 to the front wall 151 (shown in Figure 9 only) of the tool box which front wall has its upper end likewise fastened to the floor panel 20. The rear wall of the tool box is formed by the transverse body panel 152 which extends between the side walls 15 below the luggage compartment door 153. 154 is a removable cover for the tool box.

The modification shown in Figure 10 differs from the modification hitherto described only in the substitution of the housing 121 by another type of housing. In this figure is: 29 the one side sill member, 20 the floor panel, 109 the transverse offset with the front wall 111, the top wall 112 and the rear wall 113, connecting flanges 110 and inner reinforcement arm 115. The housing 155 on top of the end of the offset 109 consists of two halves 156, 157 which are welded together by means of overlapping flanges 158. These flanges surround the emplacements for the upper end of the shock absorber at 159 and the opening which is enclosed by this flange portion 159 is closed by a reinforcing plate 160 corresponding substantially to the plate 126 of the first embodiment. It is obvious that this housing 155 can be easier manufactured especially if the wheel housing is not provided with an offset 125 as shown in Figures 4 and 6 so that the completed housing has to be of considerably greater depth. Besides, the flanges 158 and their connection afford an additional reinforcing structure.

The body side sills, cross members and floor panel are, of course, wherever needed provided with bolt spacers, reinforcements and the like, some of them being shown in the drawings. It is, however, deemed not to be necessary to describe those members and their functions specifically.

The invention is liable to many modifications. It is for instance not necessarily restricted to self-sustaining bodies but many or most of its features may also be used for vehicles having a separate chassis. While the embodiment is primarily designed to be made from sheet metal stampings, the use of other materials alone or in combination with sheet metal is well conceivable. While in most instances electric spot welding for uniting the different parts is contemplated, it is obvious that any other method and means for effecting the connection as long as they are consistent with the material employed can be used. It may also be mentioned that certain features of the invention are not restricted to be used in combination with the specific kind of wheel suspension such as coil springs and airplane-type shock absorbers, but may be applied and advantageously be used in combination with other types of wheel suspensions. Yet, it should be emphasized that these are only a few examples of the possible changes, modifications and other applications of the invention and that others falling into the spirit of the invention are intended to be covered by the following claims.

What is claimed is:

1. In a vehicle body structure; a floor panel, longitudinal side sill members; body side wall panel members fastened to and extending upwardly from said side sill members; said floor panel being provided with an upwardly offset section extending nearly across the entire width of the structure but ending short of the side margins of the floor panel so that it is completely surrounded by portions of the floor panel arranged substantially in the plane of the main body thereof; the side margins of said floor panel which extend along the ends of the offset section being fastened to said sill members; bridging members extending between and fastened to the ends of said offset section and to the oppositely located portions of said body side wall members; said offset section and said bridging members forming a transverse reinforcing structure which extends continuously from the body wall member on the one side of the structure to the body wall member on the other side of the structure thereby interbracing those wall members and reinforcing the floor panel.

2. A vehicle floor panel having a plurality of portions projecting beyond one surface thereof and integrally formed as one piece therewith, said projections being spaced from each other, formed corresponding to a portion of the shape of a fuel tank and being adapted to form a bed for the same.

3. In a vehicle floor panel, a plurality of comparatively narrow elongated portions projecting beyond one surface of and integrally formed as one piece with such panel, said projections being spaced from each other, providing for corresponding recesses in the other surface of the panel, extending in the longitudinal direction of the vehicle and being formed corresponding to one side of a fuel tank so as to constitute a bed therefor, reinforcing means shaped similar to and arranged in said recesses being adapted for the attachment of strapping means for holding the fuel tank against said body.

4. In a vehicle, a floor panel provided with means forming a bed adapted for having a fuel tank strapped onto it, means for connecting strapping means for such fuel tank, a closed box-sectional transverse sill structure connected to said floor panel near but spaced from said bed so that it reinforces the panel, said connecting means being located in the interior of said sill structure.

5. In a combined body and chassis structure; a floor panel; side sill members fastened to the side margins of said floor panel; side wall panels fastened to said sill members, means for supporting the upper ends of wheel suspension springs against said floor panel near to said side sills; a casing above each spring attaching means; said casings being fastened to the upper side of said floor panel and to the respective adjoining portion of the side wall; said casings forming diagonal bracing means between the floor panel and the side panel in the region of the spring emplacements and besides supports for the upper ends of strut-type shock absorbers.

6. In a combined body and chassis structure; a floor panel, hollow section side sills fastened to the side margins of said floor panel and having upstanding inner and outer walls; means for accommodating the upper ends of wheel suspension springs against said floor panel near to said side sills; the inner walls of said side sills being outwardly offset in the region of said spring emplacements with respect to the adjacent parts of said inner walls so as to form recesses allowing the arrangement of such springs nearer to the outer margins of the structure, the outer walls of the sills being free from a corresponding offset.

7. In a combined body and chassis structure; a floor panel; side sill members fastened to the side margins of said floor panel; side wall panels fastened to said sill members; a casing fastened to the upper side of said floor panel and to the respective adjoining portion of the side wall; said casing forming a diagonal brace between the floor panel and the side panel in the region of a wheel suspension and upper supports for wheel suspension means.

8. In a combined body and chassis structure; a floor panel; side sill members fastened to the side margins of said floor panel; side wall members fastened to said sill members; a casing arranged near to one of said side sills, fastened to the upper side of said floor panel and to the adjoining portion of the side wall member; said side wall member being inwardly offset in the region of said casing; said casing forming diagonal bracing means between the floor panel and the side panel and a support for wheel suspension means; said offset side wall portion forming an additional reinforcement for said side panel and providing for a shallower casing.

9. In a structure according to claim 8; said offset portion of the side wall panel being inwardly and upwardly inclined in the region where said casing is fastened so as to bring the side wall panel in said region nearer to that point of said casing which is adapted to support wheel suspension means.

10. In a combined body and chassis structure; a floor panel; side sill members fastened to the side margins of said floor panel; side wall panels fastened to said sill members; a transverse beam structure extending upwardly from said floor panel and fastened to said side panels; a casing fastened at each side of said floor panel to the upper side of said transverse beam structure and to the respective adjoining portion of the side wall panels; said transverse structure and said casings forming transverse and diagonal bracing means between the floor panel and the side panels and said casings being adapted to form besides upper supports for strut-type shock absorbers.

11. In a structure according to claim 7, said casing being U- or about half-circle-shaped in horizontal cross section, having one end closed by a horizontal wall whereas the other end is open, and being provided with flanges along its free edges, said flanges overlapping and being fastened to the adjacent portions of the side wall panel and of the floor panel.

12. In a structure according to claim 7; said casing being U- or about half-circle-shaped in horizontal cross section and having one end closed by a horizontal wall whereas the other end is open; said casing being made from two similar halves about angle or about quarter-circle-shaped in horizontal cross-section; such halves being connected with each other along a vertical transverse plane; said casing being provided with flanges along its free edges, those flanges overlapping and being fastened to the adjacent portions of the side wall panel and the floor panel.

13. In a combined body and chassis structure; a floor panel; a side sill member fastened to one side margin of said floor panel; a side wall member fastened to said sill member; an offset on said floor panel extending upwardly therefrom and adapted to receive and support the upper end of a wheel suspension spring near to said side sill; a casing fastened to the upper side of said floor panel offset and to the respective adjoining portion of the side wall member; said offset and said casing forming diagonal and transverse bracing means between the floor panel and the side wall member in the region of the spring emplacement and said casing being besides adapted to form a support for and to receive the upper end of a strut-type shock absorber.

14. In a combined body underframe and chassis structure; a longitudinal side sill member; a floor panel fastened to said side sill member; a bracket structure fastened to said side sill member and, in a region inwardly spaced from said side sill member, to said floor panel; said bracket structure on the one hand and said floor panel and side sill member on the other hand mutually interbracing one another; said bracket extending downwardly from said sill member and said floor panel and being adapted to receive axle guiding means.

15. In a structure according to claim 14; said bracket comprising means which extend downwardly beyond said side sill member and overlap and are fastened to the inner wall and the bottom wall of such member; said bracket comprising furthermore means which extend from said first-named means toward the transverse middle plane of the vehicle and are fastened to said floor panel at a point spaced from said side sill member.

16. In a vehicle body structure; a floor panel; longitudinal side sill members; body side wall members fastened to and extending upwardly from said side sill members; an elongated transversely extending section of said floor panel being upwardly offset so as to project above the portions of the side sill members in the same longitudinal region of the structure, said section extending across about the entire width of the structure, being fastened to said side wall members and forming a support for the rear margin of a seat cushion; an elongated narrow member extending across and fastened to said floor panel in longitudinally spaced relation from said offset section, having its ends fastened to said side wall members and forming a support for the front edge of a seat cushion; the space between said offset section and said narrow member forming a storage compartment.

17. In a panel according to claim 2, said portions of the floor panel projecting downwardly so that the upper surface of the panel in the same region is substantially free from projections and is thereby adapted for supporting luggage or the like.

18. A structure according to claim 1, the form of said bridging members in longitudinal vertical section corresponding substantially to the bent form of the adjoining ends of said offset section, and the inner ends of said bridging members overlapping the outer ends of said offset and being fastened thereto in the overlapping region.

19. In a metal automobile body, a floor panel extending over a substantial part of the length of the automobile, a transverse channel formed in said floor panel to accommodate wheel suspension means, two wheel housings, one housing on each end of the channel and secured thereto, two reinforcing members inside the body, one member at each side of the vehicle, said members being positioned on the channel and against the adjacent wheel housing and secured to both.

20. In a metal automobile body, a floor panel, a channel reinforcement secured to and extending longitudinally thereof, an upwardly extending support formed in the panel to receive an axle suspension, and a mounting bracket having a projecting part extending downwardly below the floor panel secured to the channel reinforcement and including means bracing it and extending between the channel reinforcement and the upwardly extending support and secured to both, said mounting bracket serving to mount a stabilizing arm for an axle suspension.

THEODORE ULRICH.